United States Patent [19]

Fong et al.

[11] Patent Number: 4,743,396

[45] Date of Patent: May 10, 1988

[54] PUMPABLE MAGNESIUM HYDROXIDE SLURRIES

[75] Inventors: Dodd W. Fong, Naperville; Daniel V. Diep, Aurora, both of Ill.

[73] Assignee: Nalco Chemical Company, Naperville, Ill.

[21] Appl. No.: 49,891

[22] Filed: May 15, 1987

[51] Int. Cl.$^4$ .............................................. F17D 1/17
[52] U.S. Cl. ................................... 252/313.1; 137/13; 252/310
[58] Field of Search .................. 252/310, 313.1, 8.514; 137/13; 524/433; 423/164, 636

[56] References Cited

U.S. PATENT DOCUMENTS

| | | | |
|---|---|---|---|
| 2,761,834 | 9/1956 | Suen et al. | 252/8.51 |
| 4,230,610 | 10/1980 | Falcione et al. | 524/433 |
| 4,314,985 | 2/1982 | Bonney | 423/636 |
| 4,430,248 | 2/1984 | Rey | 252/310 X |

OTHER PUBLICATIONS

Kirk–Othmer, Encyclopedia of Chemical Technology, Third Edition, vol. 14, John Wiley & Sons, Inc. (1981).
The Reaction of Polyacrylamide, Formaldehyde, and Sodium Bisulfite by D. P. Bakalik & D. J. Kowalski, Journal of Polymer Science: Part A: Polymer Chemistry, vol. 25, 433-436 (1987), John Wiley & Sons, Inc.

*Primary Examiner*—Herbert B. Guynn
*Attorney, Agent, or Firm*—John G. Premo; Anthony L. Cupoli; Donald G. Epple

[57] ABSTRACT

An aqueous 50% or higher by weight magnesium hydroxide slurry having a reduced Brookfield viscosity which contains from 0.1–5% by weight based on the weight of said slurry of a sulfomethylated polyacrylamide having from 2–30 mole percent of sulfomethyl groups and having a molecular weight of from 5,000–30,000.

2 Claims, No Drawings

PUMPABLE MAGNESIUM HYDROXIDE SLURRIES

INTRODUCTION

In the production of magnesium from sea water, one of the processing steps produces a 50% or higher by weight magnesium hydroxide slurry. These slurries are pastes in consistency and are very difficult to pump or flow through pipes due to their high viscosity. This general technology is described in the *Kirk-Othmer, Encyclopedia of Chemical Technology*, Third Edition, Vol. 14, John Wiley and Sons. Inc. (1981) 634–635.

The present invention is predicated upon the discovery that small amounts of a certain sulphomethylated acrylamide polymers are capable of reducing the viscosity of 50% or higher by weight aqueous magnesium hydroxide slurries to make them easily pumpable through pipes.

THE INVENTION

The invention is an aqueous 50% or higher by weight magnesium hydroxide slurry having a reduced Brookfield viscosity which contains from 0.1-5% by weight based on the weight of said slurry of a sulfomethylated polyacrylamide having from 2-30 mole percent of sulfomethyl groups and having a molecular weight of from 5,000–30,000.

While the dosage of the sulfomethylated polymer may vary between 0.1-5% by weight, a preferred dosage is usually within the range of about 0.5-3% by weight.

THE SULFOMETHYLATED ACRYLAMIDE POLYMERS

The reaction of polyacrylamide with formaldehyde and bisulfite to produce the sulfomethylated amide is of considerable interest because of the many industrial applications that have been proposed for inexpensive polymeric sulfonates, such as water treatment agents, drilling fluid dispersants and flocculants. A variety of reactions have been postulated as taking place in the aforementioned chemical system, but no persuasive evidence has been adduced heretofore to support the proposition that sulfomethylation of the amide occurs under the conditions generally thought to produce this adduct. It is now known that the major products formed at a pH of 12 and at temperatures on the order of 75° C. are partially hydrolyzed polyacrylamide and the mono-, bis-, and tris-sulfomethylamine. See *The Reaction of Polyacrylamide, Formaldehyde, and Sodium Bisulfite* by D. P. Bakalik and D. J. Kowalski, Journal of Polymer Science: Part A: Polymer Chemistry, Vol. 25, 433–436 (1987), John Wiley and Sons, Inc.

It is also now known that sulfomethylamide-containing polymers are actually prepared from acrylamide-containing polymers with sodium formaldehyde bisulfite (or formaldehyde and sodium bisulfite) in from about ¼ to about 8 hours at temperatures of at least about 100° C. and at a pH of less than 12, preferably at temperatures higher than 100° C. and at a pH of 3 to 8. Under these reaction conditions, sulfomethylamide readily forms in high conversion, based on the sodium formaldehyde bisulfite charged.

In order to describe the preparation of these polymers, the following specific examples are given without, however, limiting the invention to the precise details and conditions described except as required in the appended claims.

EXAMPLE 1

A solution of poly(acrylamide [75 m %]-acrylic acid) (150 g, 27.5% in water) and sodium formaldehyde bisulfite (15.5 g), pH 4.3, was heated to 150° C. and maintained at that temperature for four hours in a 300 ml. Parr reactor which was equipped with a mechanical stirrer and a thermocouple. The resultant product was cooled to room temperature. The pH of the resulting polymer solution was 5.9. Results of C-13 NMR analysis showed that the polymer contained about 20% sulfomethylamide and about 30% carboxylate.

EXAMPLE 2

A solution of poly(acrylamide [75 m %]-acrylic acid) (150 g, 27.5% in water) and sodium formaldehyde bisulfite 15.5 g), pH 4.3, was heated to and maintained at 120° C. for four hours in a 300 ml. Parr reactor which was equipped with a mechanical stirrer and a thermocouple. The resultant product was cooled to room temperature. The pH of the resulting polymer solution was 5.6. Results of C-13 NMR analysis showed that the polymer contained about 15% sulfomethylamide and about 40% carboxylate.

EXAMPLE 3

(a) A solution of polyacrylamide (100 g, 28.5%) and sodium formaldehyde bisulfite (16.1 g), pH adjusted to 13 with 50% NaOH, was heated to 50° C. for three hours. Results of C-13 NMR analysis of the product showed no sulfomethylamide formation.

(b) The reaction mixture was again heated, to 90° C. for three hours. Results of C-3 NMR analysis of the product showed no sulfomethylamide formation.

(c) The reaction mixture was then heated in a Parr reactor to 150° C. for four hours. The pH of the final polymer solution was 9.8. Results of C-13 NMR analysis of the product showed that the resulting polymer contained about 10% sulfomethylamide.

From the foregoing examples, it will be apparent that sulfomethylpolyacrylamide was produced at temperatures of at least about 100° C. and at pH levels of less than about 12.

The amount of sulfomethylamide group incorporated into the copolymers can be determined by photometric colloid titration at two pH's. The principle of this method is based on the fact that formaldehyde bisulfite will not be detected by this method. At a pH of 2–3, the carboxylic acid functionally will be negligibly ionized so that only the strong sulfonate group incorporated in the backbone will be determined by titration. At a pH of 10, since the carboxylic acid is completely ionized, both it and the sulfonate group will be titrated. The amount of sulfomethylamide incorporation determined by this method is in good agreement with that determined by the C-13 NMR method.

The term "sulfomethylpolyacrylamide" is used herein to encompass the sulfomethylated homopolymers of acrylamide or their homologs and the sulfomethylated copolymers, including terpolymers, of acrylamide or their homologs, with acrylic acid or its homologs, the essential characteristic of the polyacrylamide moiety being the presence of a primary amide group.

To treat the magnesium hydroxide slurries, it is preferred to use sulfomethylated polymers of the type described above which contain 2-30 mole percent of sulfomethylated groups and preferably those containing 2-20 mole percent.

The molecular weight of the sulfomethylated polymers should be within the range of 5,000-30,000 with a preferred molecular weight range being 5,000-20,000.

To further illustrate the invention, Table I is presented below:

TABLE I

Brookfield Viscosities of 65 Weight Percent Mg(OH)$_2$ Slurries

| Additives | MW[1] | Additive Dosage (wt %) B.O. Slurry | Brookfield Viscosity of the Slurry, CPS |
|---|---|---|---|
| Blank | — | — | 248,000 |
| Poly(Acrylic acid[83 mole %]-methyl acrylate) | 5,800 | 0.46 | 120,000 |
| Poly(Acrylic acid[85 mole %]-ethyl acrylate) | 3,300 | 0.46 | 68,000 |
| Poly(Acrylic acid[50 mole %]-acrylamide) | 16,000 | 0.46 | 66,000 |
| Poly(Acrylic acid[90 mole %]-acrylamide) | 17,000 | 0.46 | 84,000 |
| Poly(Acrylic acid[56 mole %]-acrylamide[40 mole %]-sulfomethylacrylamide [4 mole %] | 5,500 | 0.46 | 48,000 |
| Poly(Acrylic acid[57 mole %]-acrylamide[27 mole %]-sulfomethylacrylamide [17 mole %] | 18,000 | 0.46 | 2,400 |

[1]The molecular weights of the polymers were determined by GPC using polystyrene sulfonic acid standards.

Having thus described our invention, we claim:

1. An aqueous 50% or higher by weight magnesium hydroxide slurry having a reduced Brookfield viscosity which contains from 0.1-5% by weight based on the weight of said slurry of a sulfomethylated polyacrylamide having from 2-30 mole percent of sulfomethyl groups and having a molecular weight of from 5,000-30,000.

2. The concentrated slurry of claim 1 wherein the amount of the sulfomethyl groups in the polyacrylamide is between 2-20 mole percent and its molecular weight is from 5,000-20,000.

* * * * *